E. HATTON.
ICE CUTTING MACHINE.
APPLICATION FILED OCT. 6, 1909.
964,104.
Patented July 12, 1910.
3 SHEETS—SHEET 1.
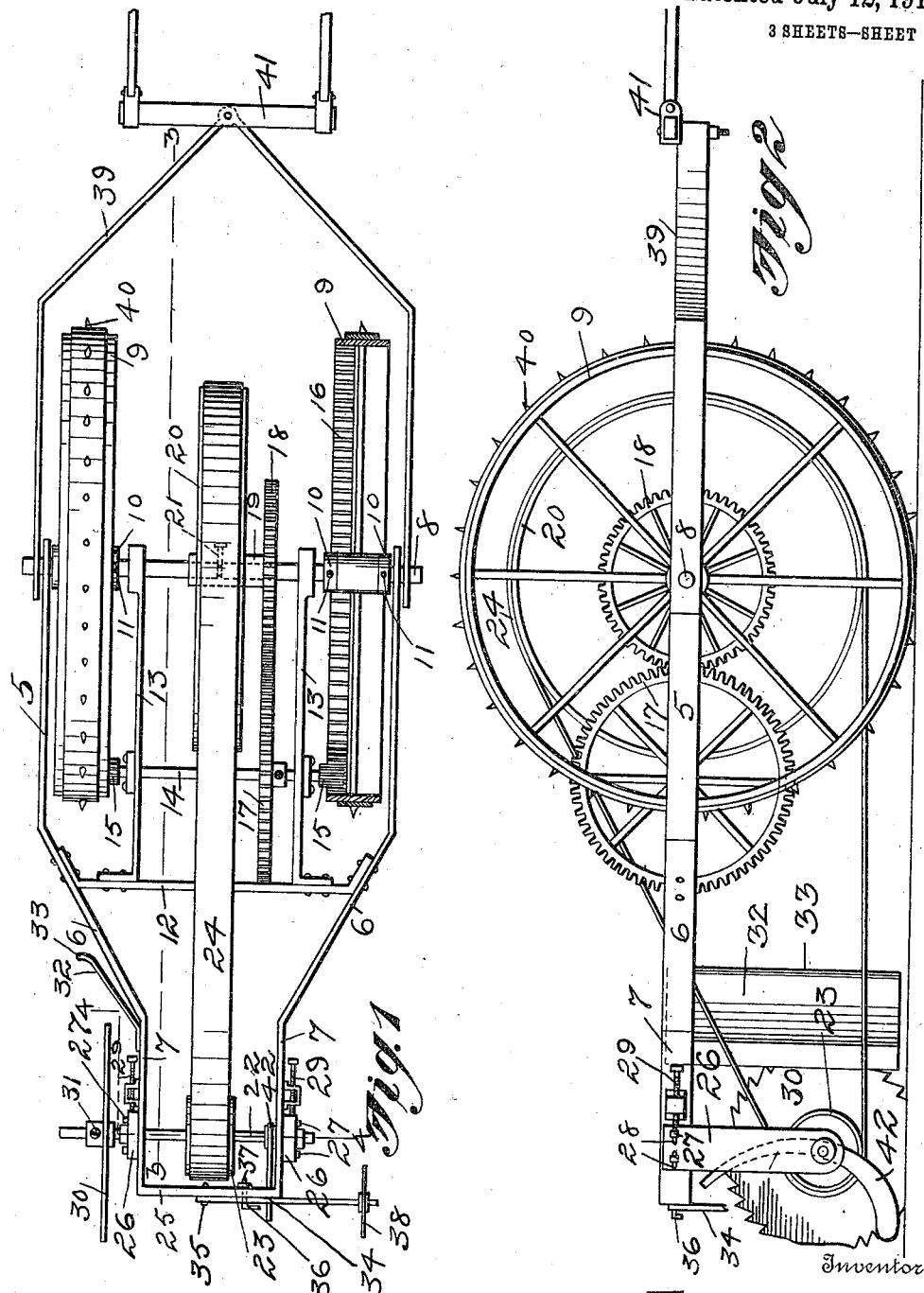
Witnesses
Inventor
Edgar Hatton
By Woodward & Chandler
Attorneys

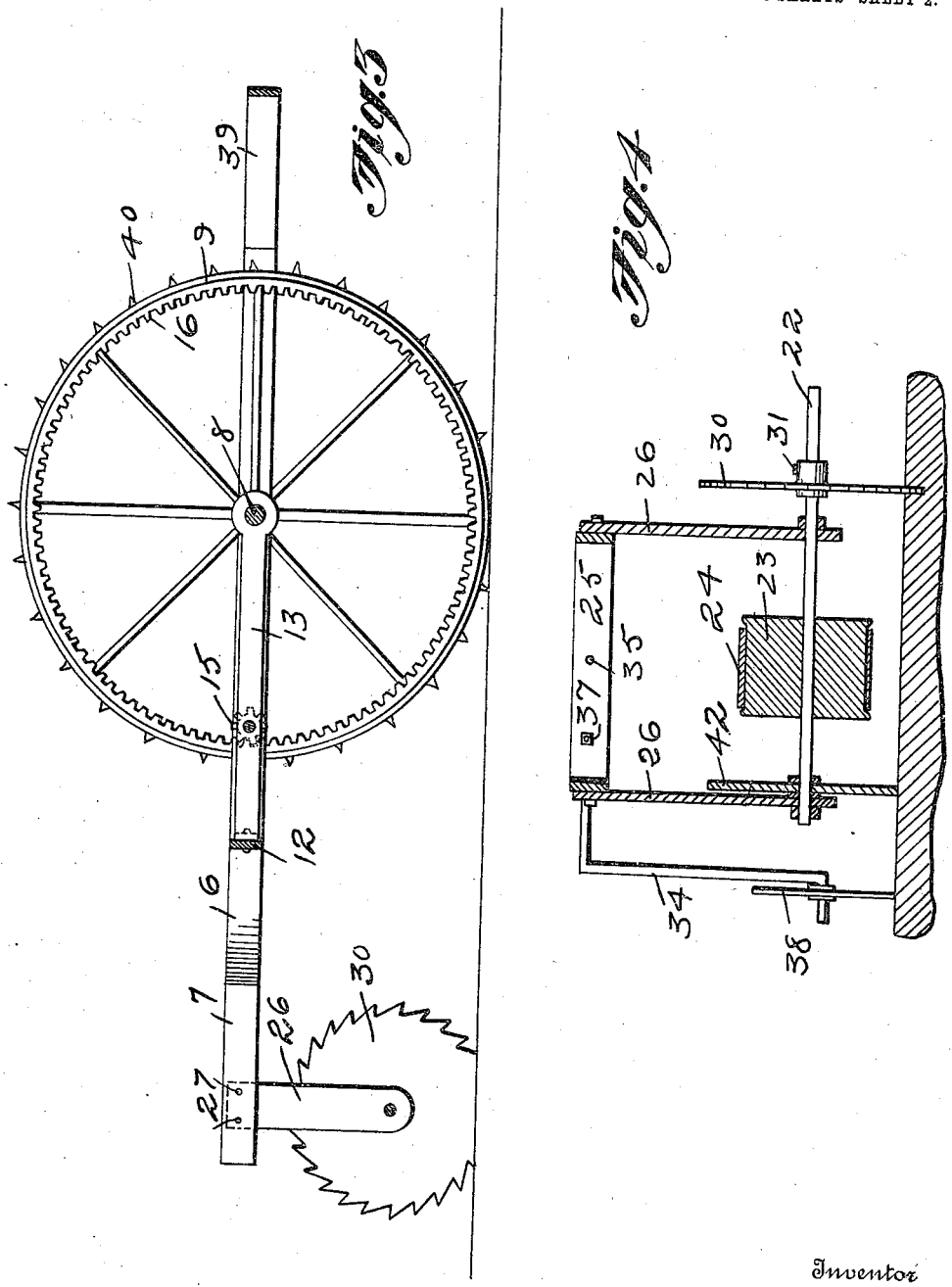

E. HATTON.
ICE CUTTING MACHINE.
APPLICATION FILED OCT. 6, 1909.

964,104.

Patented July 12, 1910.
3 SHEETS—SHEET 3.

Witnesses

Inventor
Edgar Hatton
By Woodward & Chandler
Attorneys

UNITED STATES PATENT OFFICE.

EDGAR HATTON, OF HAVANA, ILLINOIS, ASSIGNOR OF ONE-FOURTH TO EDWARD J. KRAMPFF AND ONE-FOURTH TO SAMUEL F. KYLE, BOTH OF HAVANA, ILLINOIS.

ICE-CUTTING MACHINE.

964,104.      Specification of Letters Patent.      Patented July 12, 1910.

Application filed October 6, 1909. Serial No. 521,212.

*To all whom it may concern:*

Be it known that I, EDGAR HATTON, a citizen of the United States, residing at Havana, in the county of Mason and State of Illinois, have invented certain new and useful Improvements in Ice-Cutting Machines, of which the following is a specification.

This invention has relation to certain new and useful improvements in ice cutting machines and has for its object to provide a machine for harvesting ice whereby the ice may be rapidly cut into blocks of a predetermined size, by means of a circular saw rotatably mounted in a suitable wheeled frame, said saw being driven by means of suitable connections whereby the power is transmitted from the wheels.

A further object is to provide new and novel means for transmitting the rotary movement to the saw from the drive wheels.

A further object is to provide an adjustable ice cutting saw, said saw being longitudinally movable with relation to the supporting frame whereby the driving belt or chain may be tightened.

A still further object is to provide suitable means for elevating the saw above the surface of the ice field.

With these and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

Figure 5:
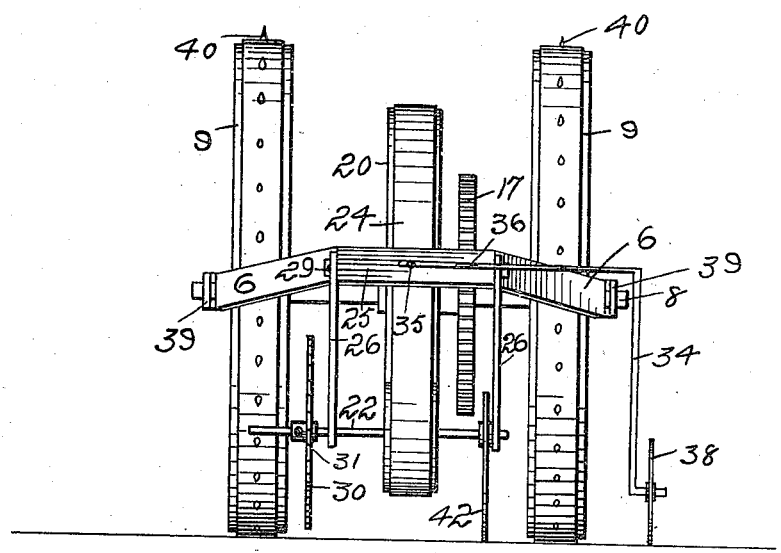
Figure 6:
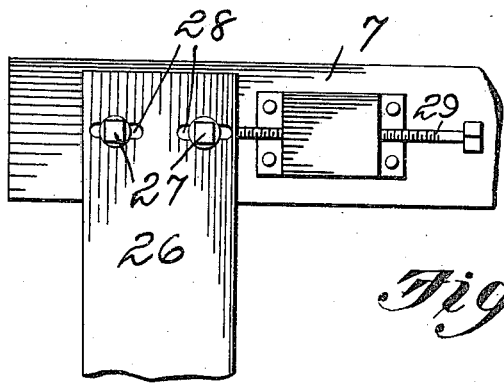

In the drawings forming a part of this specification and in which like numerals of reference indicate similar parts in the several views, Figure 1 is a top plan view of an ice cutting machine embodying my improvements. Fig. 2 is a side elevation showing the machine in operative position on the ice field. Fig. 3 is a section taken on the line 3—3 of Fig. 1. Fig. 4 is a section taken on the line 4—4 of Fig. 1. Fig. 5 is an enlarged elevation of the rear end of the machine, showing the saw elevated above the ice surface. Fig. 6 is a detailed section illustrating the means for tightening the driving belt.

Referring to the drawings 5 indicates a wheel supported frame, the rear portion of which converges as shown at 6 and is extended in parallel to provide the supporting arms 7. This frame is constructed of bar metal or angle iron and a wheel shaft 8 is rigidly secured in the forward ends thereof.

Drive wheels 9 are revolubly mounted upon the shaft 8 and are secured thereon against longitudinal movement by means of the collars 10 which are secured to the shaft by means of set screws 11.

A brace bar 12 connects the rear converging portion of the frame and shaft supporting bars 13 are secured to the bar 12 and the shaft 8. In the bars 13 a transversely positioned shaft 14 is rotatably mounted and carries the pinions 15 which mesh with an internal gear 16 on each of the wheels 9. The shaft 14 also carries a gear 17 intermediate of its ends which is engaged with a pinion 18 disposed on the shaft 8. The pinion 18 is integrally formed with a sleeve 19 upon which a band wheel 20 is mounted. The wheel 20 is rigidly secured upon the sleeve by means of the set screw 21, which extends through the sleeve and has its end disposed in a circumferential groove in the shaft 8.

In the rear parallel arms 7 a transverse shaft 22 is rotatably mounted which carries a band wheel 23. This wheel is disposed in longitudinal alinement with the wheel 20, said wheels being connected by means of a driving belt 24. The extremities of the arms 7 are connected by a bar 25, thus forming a very rigid supporting frame. Blocks 26 are disposed upon the outer faces of the arms 7 and depend below the same. In the lower ends of the blocks the shaft 22 is disposed, and bolts 27 adjustably secure the blocks to the arms. These bolts extend through the short slots 28 in the arms, and are movable therein when the adjusting screw 29 which engages with one side of the block is turned. Thus the shaft 22 may be moved longitudinally in the frame and secured in its adjusted position by tightening the nuts upon the ends of the bolts 27. Upon the shaft 22 and exteriorly of the arm 7 a circular saw 30 is mounted and is longitudinally adjustable thereon. The saw is secured in its adjusted position by means of the set screw 31, whereby ice blocks of various widths may be cut. Rigidly secured to the shaft adjacent to the saw there is a shield 32, the forward end of which is transversely curved as shown at 33. In this manner the saw is protected from contacting with obstructions which may lie in its path of movement.

Upon the rear transverse bar 25 of the frame an L shaped arm 34 is transversely disposed, and is pivoted to the center of the bar by means of the short headed bolt 35. A bolt 36 is removably positioned through the bar 25 adjacent to one end thereof and extends through the horizontal part of the arm 34 to secure the arm in position, for which purpose a nut 37 is threaded on the outer end of the bolt. Upon the lower end of the vertical part of the arm 34 a disk 38 is secured and is adapted to be positioned in the cut or channel previously made by the saw 30. Thus the width of the ice blocks which is determined by adjusting the saw blade of the shaft 22 may be uniform. The blade 30 may be entirely removed from the shaft and positioned upon the opposite end thereof, while the disk 38 may also be placed on the opposite side of the machine by removing the arm 34 and turning it over.

The drive wheels 9 are each provided with the teeth or spurs 40 which project from the tread of the wheels and engage with the ice surface to prevent skidding of the machine. Secured to the ends of the shaft 8 there is a yoke 39, to the forward end of which a draft bar 41 is secured. Shafts may be connected to the front end of the yoke 39 in place of the draw bar, if desired, this being a mechanical equivalent which it is not believed necessary to illustrate.

From the foregoing it will be seen that I have provided an ice harvesting machine of comparatively simple construction, the various parts of which are so formed as to render its operation very simple and efficient.

A cam lever 42 is pivoted upon the rear bar 25 of the frame, and during the operation of the machine is disposed in the position shown in Fig. 2. When it is desired to raise the saw 30 above the ice field, this lever is thrown rearwardly, the cam portion of which engages with the surface of the ice, and elevates the frame, saw 30 and guide disk 38, thus allowing the machine to be freely moved from place to place.

By the use of a machine constructed as above set forth the ice may be easily and quickly cut with little or no difficulty in the operation of the machine.

It will be understood that any desirable number of saws may be utilized in this machine if found desirable.

What is claimed is:

1. In an ice cutting machine, the combination of a supporting frame, a wheel shaft rigidly mounted in the forward end of said frame, traction wheels revolubly mounted on said shaft, a transversely positioned shaft supported in the frame, pinions carried on the opposite ends of said shaft, each of said traction wheels having an internal gear engaged with one of said pinions, a pinion on the wheel shaft, a band wheel on the wheel shaft adapted to rotate in unison with said pinion, a gear carried by the transverse shaft engaged with the pinion on the wheel shaft, a shaft transversely positioned in the rear end of said frame, a circular saw longitudinally adjustable upon said shaft, a band wheel carried by said shaft and an endless belt connecting said band wheel with the band wheel on the wheel shaft to impart rotary movement to said saw.

2. In an ice cutting machine, the combination of a supporting frame, a transversely positioned shaft mounted in said frame, traction wheels revolubly mounted on said shaft, a band wheel centrally positioned on said shaft, driving connections between the traction wheels and said band wheel, a transversely positioned longitudinally adjustable shaft mounted in the rear end of said frame, means for securing said shaft in its adjusted position, and a circular saw removably carried on the end of said shaft, said saw being longitudinally adjustable on said shaft, a band wheel carried by said shaft, an endless belt connecting said wheel with the band wheel on the wheel shaft, and a guide disk mounted upon the rear end of said frame, said disk being movable to either side of the frame.

3. In an ice cutting machine, the combination of a frame, a shaft rigidly mounted in said frame, traction wheels revolubly mounted on said shaft, a transverse brace bar secured in said frame, longitudinal supporting bars secured to said shaft and to said brace bar, a transverse shaft rotatably mounted in said bars, pinions carried on the opposite ends of said shaft, said wheels having internal gears engaging with said pinions, a pinion mounted on the wheel shaft, said pinion having a sleeve integrally formed therewith, a band wheel rigidly secured on said sleeve, a gear carried by said transverse shaft engaged with said pinion, a transversely positioned shaft rotatably mounted in the rear end of said frame, a circular saw carried by said shaft, a shield for said saw, a driving connection between said band wheel and said shaft, and means for elevating the rear end of said frame.

4. In an ice cutting machine, the combination of a frame, traction wheels revolubly mounted in said frame, a draft yoke secured to the wheel shaft and extending forwardly of the frame, a shaft transversely positioned below the rear end of said frame, said shaft having its ends mounted in blocks movable on the frame, said blocks carrying bolts positioned in longitudinal slots in the frame, an adjusting screw adapted to move said blocks and shaft on the frame, a saw longitudinally adjustable on one end of said shaft, a shield positioned in advance of the saw, driving connections between the traction wheels and the shaft to rotate said saw, an L-shaped arm removably mounted at one end of said frame, a disk carried by the outer and lower end of said arm, clamping bolts adapted to secure the arm on the frame, said arm being transversely positioned and movable to position the disk upon either side of the frame, and a cam lever carried by said frame and adapted to elevate the saw and disk above the ice surface to an inoperative position.

In testimony whereof I affix my signature, in presence of two witnesses.

EDGAR HATTON.

Witnesses:
 JAMES S. MEIGS,
 CLAUDE B. HARMISON.